(12) United States Patent
Hargett, Jr. et al.

(10) Patent No.: US 7,307,248 B2
(45) Date of Patent: Dec. 11, 2007

(54) METHOD AND APPARATUS FOR MICROWAVE ASSISTED HIGH THROUGHPUT HIGH PRESSURE CHEMICAL SYNTHESIS

(75) Inventors: Wyatt P. Hargett, Jr., Matthews, NC (US); James E. Thomas, Harrisburg, NC (US)

(73) Assignee: CEM Corporation, Matthews, NC (US)

( * ) Notice: Subject to any disclaimer, the term of this patent is extended or adjusted under 35 U.S.C. 154(b) by 819 days.

(21) Appl. No.: 10/707,376

(22) Filed: Dec. 9, 2003

(65) Prior Publication Data

US 2005/0121307 A1 Jun. 9, 2005

(51) Int. Cl.
*H05B 6/64* (2006.01)
*B01J 19/08* (2006.01)

(52) U.S. Cl. ...................... 219/686; 422/186
(58) Field of Classification Search ............... 219/686, 219/678, 687, 440, 651; 422/186, 129; H05B 6/64; B01J 19/08
See application file for complete search history.

(56) References Cited

U.S. PATENT DOCUMENTS

| | | | | |
|---|---|---|---|---|
| 5,167,058 A | * | 12/1992 | Armstrong, Jr. ............. | 29/252 |
| 5,334,402 A | * | 8/1994 | Ovadia ....................... | 426/241 |
| 5,420,401 A | | 5/1995 | Jacquault et al. | |
| 5,777,300 A | * | 7/1998 | Homma et al. ............. | 219/679 |
| 5,860,508 A | * | 1/1999 | Foster ...................... | 198/750.5 |
| 5,932,817 A | | 8/1999 | Quentin | |
| 5,958,137 A | * | 9/1999 | Caldwell et al. ............ | 118/663 |
| 5,972,711 A | | 10/1999 | Barclay et al. | |
| 5,988,877 A | | 11/1999 | Hochrad et al. | |
| 6,124,582 A | * | 9/2000 | Thomas et al. ............. | 219/687 |
| 6,136,276 A | | 10/2000 | Hargett, Jr. et al. | |
| 6,227,041 B1 | | 5/2001 | Collins et al. | |
| 6,242,723 B1 | * | 6/2001 | Lautenschlager .......... | 219/679 |
| 6,246,038 B1 | | 6/2001 | Thomas et al. | |
| 6,268,570 B1 | | 7/2001 | McLendon et al. | |
| 6,287,526 B1 | | 9/2001 | Hargett, Jr. | |
| 6,288,379 B1 | | 9/2001 | Greene et al. | |
| 6,294,772 B1 | | 9/2001 | Greene et al. | |
| 6,302,577 B1 | | 10/2001 | Jennings et al. | |
| 6,320,170 B1 | | 11/2001 | Jennings et al. | |
| 6,373,040 B2 | | 4/2002 | Thomas | |
| 6,462,321 B2 | | 10/2002 | Revesz et al. | |
| 6,464,477 B1 | * | 10/2002 | Wu .............................. | 417/569 |
| 6,521,876 B2 | | 2/2003 | Jennings et al. | |
| 6,566,637 B1 | | 5/2003 | Revesz et al. | |
| 6,607,920 B2 | | 8/2003 | Jennings et al. | |
| 6,744,024 B1 | | 6/2004 | Hayes et al. | |
| 6,753,517 B2 | | 6/2004 | Jennings | |
| 2002/0117498 A1 | | 8/2002 | Jennings | |
| 2003/0089706 A1 | | 5/2003 | Jennings | |
| 2004/0101441 A1 | | 5/2004 | Jennings | |

* cited by examiner

*Primary Examiner*—Daniel Robinson
(74) *Attorney, Agent, or Firm*—Summa, Allan & Additon, P.A.

(57) ABSTRACT

A method and associated instrument are disclosed for increasing the sequential rate at which a series of microwave assisted chemical reactions that potentially generate high pressure can be carried out.

9 Claims, 2 Drawing Sheets

METHOD AND APPARATUS FOR MICROWAVE ASSISTED HIGH THROUGHPUT HIGH PRESSURE CHEMICAL SYNTHESIS

BACKGROUND OF INVENTION

The present invention relates to microwave assisted chemistry techniques and apparatus, and in particular, relates to a method and apparatus for microwave assisted high throughput chemical synthesis.

Microwave assisted chemical synthesis refers to the use of electromagnetic radiation within the microwave frequencies to provide the energy required to initiate, drive, or accelerate certain chemical reactions. As chemists have long been aware, the application of heat energy is one of the most significant factors in increasing the rate of a wide variety of chemical reactions. Thus, generally familiar devices such as the Bunsen burner, other types of gas burners, hot plates, and other similar devices have historically been used to initiate or accelerate various chemical reactions.

Microwave assisted reactions, however, can be completed in a much shorter period of time. It will be understood that this time savings has a particularly significant advantage in any situation in which large number of samples must be tested on an almost continuous basis, or high throughput analysis. Understood by those familiar with the electromagnetic spectrum, the term "microwave" is often used generically to refer to radiation with wavelengths of between about 1000 and 500,000 microns ($\mu$), and corresponding frequencies of between about $1\times10^9$ and $5\times10^{11}$ Hertz (Hz). These are arbitrary boundaries, however, and other sources refer to microwaves as having frequencies of between about 108 Hz and $10^{12}$ Hz and wavelengths of between about 300 centimeters (cm) and 0.3 millimeters (mm).

Microwave assisted chemistry is relatively new compared to some other techniques, however, it has become well established and accepted in a number of analytical applications. For example, the use of microwave energy is well suited for the accelerated decomposition and analysis of fat and oil content in a sample, as disclosed in U.S. Pat. No. 6,548,304 to Collins and assigned to CEM Corporation of Matthews, N.C. As another example, published U.S. Patent Application No. 2003/0089706 to Jennings, and assigned to CEM Corporation, discloses the use of microwave energy for chemical synthesis processes. These and many other examples provide sufficient evidence as to the usefulness and enormous potential that the utilization of microwave energy has in chemical synthesis, particularly the field of combinatorial chemistry.

The field of combinatorial chemistry stands to benefit greatly from the proper utilization of microwave energy. Combinatorial chemistry has emerged as one of the most promising approaches to chemical library synthesis for the purpose of drug discovery. Traditional methods that use sequential and parallel methods of organic synthesis generally comprise a starting array of reagents that are dispensed to specialized tubes, where additional reagents may be added. This is followed by the application of heat or light energy, which is followed by an additional dispensing of the products to a product array (such as a microtiter plate).

This conventional methodology suffers from two main drawbacks. First, it is far too slow to meet the current demand for chemical library generation. Despite accelerating this process by running the reactions in a parallel manner, the complexity and expense soon outweighs the benefit of the moderate gain in speed. Secondly, current methodology typically requires set volumes of liquid in a given synthesis run. This limits the flexibility of the process to generate compounds via different reactions.

The generation of chemical libraries, also referred to as chemical compound libraries, or small molecule libraries, is necessary for screening against a rapidly growing range of therapeutic targets resulting from genomics research. Novel compounds are also useful for testing on current therapeutic targets to search for drugs with maximum efficacy and minimal side effects.

Given the current demand for novel compounds in drug discovery research, there is a need for improving the adaptation of microwave energy to synthesize chemical libraries at an exponentially faster pace.

Progress is occurring in these areas. For example, the VOYAGER™, DISCOVER™, NAVIGATOR™ and EXPLORER™ instruments available from CEM Corporation, Matthews, N.C., USA (the assignee of the present invention) offer significant advantages in microwave assisted chemistry particularly in the areas of small sample size, appropriate application of energy and automated sample handing. Relevant patents and applications describing these devices include U.S. Pat. No. 6,607,920; published U.S. application No. 20030199099; and pending U.S. application Ser. Nos. 10/064,261 filed Jun. 26, 2002; Ser. No. 10/064,623 filed Jul. 31, 2002; Ser. No. 10/065,851 filed Nov. 26, 2002; and Ser. No. 10/605,021 filed Sep. 2, 2003. The contents of all of these are incorporated entirely herein by reference.

Nevertheless, the current technology with respect to adapting microwave energy to high throughput chemical library synthesis is limited in several ways. First, microwave assisted synthesis reactions are typically run in series (even if automated), rather than in parallel. This compromises the speed advantage that microwave synthesis has over conventional techniques because more time is spent moving tubes into and out of the microwave chamber.

Secondly, the current technology is limited with respect to the use of liquid and solid reagents under pressure. The speed advantage gained with the use of microwaves is negated by the need for sealing or "crimping" the reaction tube(s) to maintain the proper pressure for the reaction. The mechanism required for crimping the tubes further adds expense and moving parts to the process. Opening such tubes or vessels likewise requires mechanical decrimping steps. All of these steps, even if automated, add time, mechanical complexity and expense.

Stated in an alternative fashion, the use of microwaves to treat continuously flowing compositions ("flow-through") in some fashion is generally well understood; e.g. commonly assigned U.S. Pat. No. 5,420,039 (for flow through digestion). Similarly, carrying out pressurized or pressure-generating reactions using microwave assistance is also well established; e.g. commonly assigned U.S. Pat. No. 6,287,526 (for high pressure reactions in closed vessel systems). Nevertheless, combining each of these relative advantages in an efficient fashion—i.e., an instrument that maintains both a high-throughput and the capability to carry out reactions at elevated pressures-remains a desired goal in this art.

Accordingly, the need exists for instruments and associated methods that take advantage of microwave assisted chemistry, that increase the rate of throughput, that are or can be automated, that are efficiently-sized for widespread laboratory use, that are economically efficient, and that can handle high-pressure reactions concurrently with their high-throughput advantages.

SUMMARY OF INVENTION

In one aspect, the invention is a method of increasing the sequential rate at which of microwave assisted chemical reactions that potentially generate high pressure can be carried out. The method comprises opening a pressure-resistant valve on a microwave-transparent pressure-resistant vessel to define a unpressurized pathway through the valve into the vessel, inserting a tube through the pathway in the valve and into the vessel, transferring at least one composition into the vessel through the tube, removing the tube from the vessel and from the pathway in the valve, closing the valve to seal the vessel against pressure release, and exposing the vessel and its contents to microwave radiation.

In another aspect the invention is vessel assembly for increasing the rate at which high-pressure sequential microwave-assisted reactions can be carried out. The assembly comprises a pressure-resistant reaction vessel formed of a material that is substantially transparent to microwave radiation for holding compositions that can be exposed to microwave radiation while in said vessel, a pressure-retaining sealing valve at the mouth of said vessel that can be alternately oriented to include at least one open pathway entirely through said valve into said vessel and to seal said vessel against pressure release, a tube for extending through said open pathway in said valve and into said vessel for providing composition communication with said vessel through said tube, and means for mechanically inserting and retracting said tube into and from said vessel through said pathway in said valve so that compositions can be added to said vessel when said valve is open and said tube is inserted and so that said valve can be closed to seal said vessel to retain pressure therein when said tube is retracted.

In yet another aspect, the invention is an instrument for increasing the rate at which high-pressure sequential microwave-assisted reactions can be carried out. The instrument comprises a source of microwave radiation, a cavity in microwave communication with said source, an attenuator that forms at least a portion of said cavity, a pressure-resistant microwave-transparent reaction vessel having portions in said cavity and portions in said attenuator, a pressure-resistant valve on the mouth of said vessel, a reciprocating tube for passing through said valve and into said vessel when said valve is open, and means for mechanically inserting and retracting the tube through said valve and into said vessel when said vessel is in said cavity and said attenuator.

The foregoing and other objects and advantages of the invention and the manner in which the same are accomplished will become clearer based on the followed detailed description taken in conjunction with the accompanying drawings.

DETAILED DESCRIPTION

Figure 1:
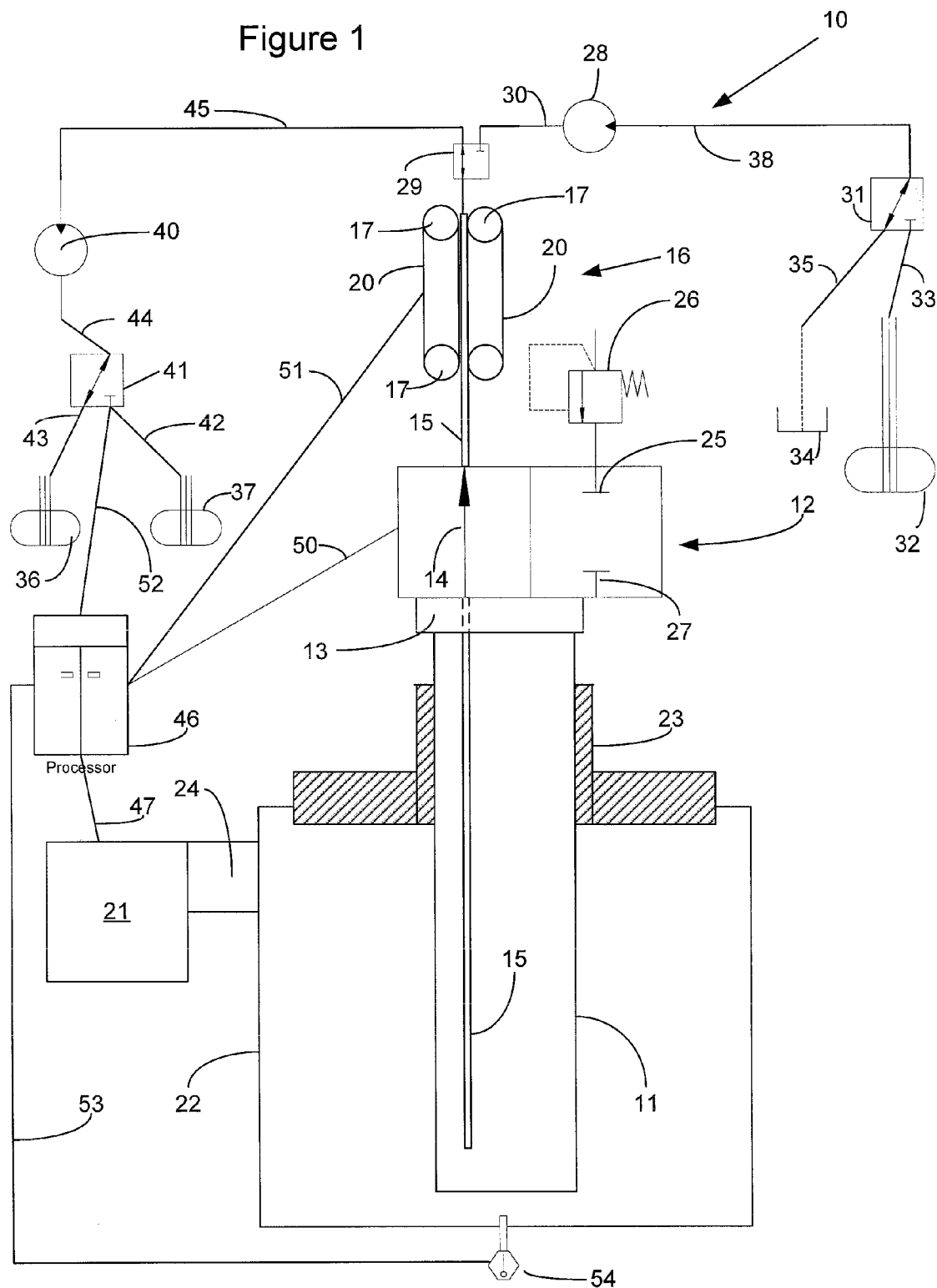
FIG. 1 is a schematic diagram of an instrument and vessel assembly according to the present invention.

In a first embodiment, the invention is a vessel assembly for increasing the throughput rate at which a series of high-pressure sequential microwave assisted reactions can be carried out. This embodiment, along with some additional features, is illustrated in FIG. 1 as part of the microwave instrument broadly designated at 10. FIG. 1 is a schematic diagram that is not drawn to scale, and thus should be understood in its schematic and illustrative context. More exact descriptions and diagrams of certain of the features can be found in certain of the incorporated references, including for example commonly assigned U.S. Pat. No. 6,607,920, the contents of which are incorporated entirely herein by reference.

The vessel assembly includes a pressure resistant reaction vessel designated at 11. The vessel 11 is formed of a material that is substantially transparent to microwave radiation for holding compositions that can be exposed to microwave radiation while those compositions are in the vessel 11. The term "pressure resistant" is used herein in the context of the types of reactions being carried out and at representative or desired temperatures. Typically, temperatures for certain sophisticated organic synthesis and related reactions may, or may need to, reach between about 250° and 300° C. Higher temperatures are often (but not always) undesirable because of the decomposition that generally results under such conditions.

Accordingly, the vessel 11 needs to be able to withstand the accompanying pressure, whether from the increased temperature alone or when reactions generate gases as products or byproducts. Such pressures are typically on the order of between about 250 and 300 pounds per square inch (psi, or between about 17 and 21 bar). A number of materials are appropriate for such vessels with glass, quartz, and various engineering polymers being most suitable for a number of reasons. These include (in addition to microwave transparency) their resistance to acids, bases, organic solvents and organic compositions. Generally speaking, such appropriate vessel materials are well established and well understood in this art and will not be otherwise described in detail herein.

The vessel assembly includes a pressure retaining sealing valve broadly designated at 12 in FIG. 1. The valve 12 is positioned at the mouth 13 of the vessel 11 and as noted earlier is illustrated schematically and not necessarily to scale. The valve 12 can be alternately oriented to include at least one pathway designated by the arrow 14 which pathway extends entirely through the valve 12 and into the vessel 11. When the valve 12 is closed, it functions to seal the vessel against the relevant pressures (as noted above) that are most typical for organic reactions.

In carrying out the invention, a ball valve is presently preferred and exemplary valves are commercially available from sources such as Swagelok Company Solon, Ohio, USA or from Tyco Valves and Controls, Atlanta, Ga., USA.

The vessel assembly next includes a tube designated at 15. The tube 15 extends through the open pathway 14 in the valve 12 and into the vessel 11 for providing composition communication, potentially including liquids, solids and gases, with the vessel 11 through the tube 15. It will accordingly be understood that the size of the tube 15 complements the available size of the opening of the pathway 14 in the valve 12 and vice versa. Stated differently, if for various reasons the size of the opening in the valve 12 is the limiting factor, then the size of the tube 15 can be selected to be small enough to pass through it. Alternatively, if the size of the tube 15 is the more relevant factor, the valve 12 can be selected to accommodate the tube 15. In presently preferred embodiments, a tube of about ⅛ inch (about 0.3 cm) outside diameter is appropriate for fluid supply purposes, and ball valves having sufficiently sized openings are commercially available.

As in the case of the vessel, the tube 15 is preferably formed of a material that is substantially resistant to acids, bases, organic solvents and the organic compositions, including reactants, products, catalysts, and byproducts, that are expected to be used. For a number of reasons that are quite familiar to chemists, materials such as fluorinated polymers, the most typical of which is polytetrafluoroethylene (often referred to by the brand name Teflon) are generally most desirable, but other compositions can be used as appropriate. Again, for any particular application the material can be selected to match the expected use. Thus in some circumstances where the materials of the vessel 11 and the tube 15 are less likely to encounter harsh chemicals, they can be selected on a cost basis from less expensive materials. Alternatively, where chemical resistance is the driving factor rather than cost, the tube should be a selected to be of the highest possible resistance, with the fluorinated hydrocarbon polymers being generally preferred. A flexible tube is also desirable in many circumstances, but is not an absolute requirement and tubes formed of other materials such as glass, quartz, metals or alloys, can be appropriately used in some circumstances. Indeed, in some circumstances the composition of the tube can be selected to act as a catalyst for a particular reaction.

The vessel assembly of FIG. 1 further includes means, shown as the driving assembly broadly designated at 16, for mechanically inserting and retracting the tube 15 into and from the vessel 11 through the pathway 14 in the valve 12 so that compositions can be added to the vessel 11 when the valve 12 is open and the tube 15 is inserted and so that the valve 12 can be closed to seal the vessel 11 to retain pressure in the vessel 11 when the tube 15 is retracted.

In FIG. 1, the driving assembly 16 is illustrated as sets of roller pairs 17 that drive corresponding belts 20 that are in frictional contact with upper portions of the tube 15 so that the movement of the rollers 17 and the driven movement of the belts 20 raises and lowers the tube 15 to insert and retract the tube 15 through the valve 12 and into the vessel 11 in the desired manner. It will be understood that the driving assembly 16 illustrated herein is schematic and illustrative of any equivalent method for inserting and retracting the tube and is exemplary rather than limiting of the claimed invention.

FIG. 1 illustrates some additional aspects of the invention, particularly in the context of an instrument. In this context, the invention is an instrument for increasing the rate at which high-pressure sequential microwave assisted reactions can be carried out. In this aspect, the instrument, again broadly designated at 10 in FIG. 1, comprises a source of microwave radiation 21, a cavity 22 in microwave communication with the source 21 and an attenuator 23 that forms at least a portion of the microwave cavity 22. FIG. 1 also illustrates that in many circumstances, the instrument can also include a waveguide 24 between the source 21 and the cavity 22.

In the context of the instrument 10, the pressure resistant microwave transparent reaction vessel 11 has portions that are in the cavity 22 and portions that are in the attenuator 23. The pressure resistant valve 12 is again positioned on the mouth of the vessel 11, and the instrument 10 includes the reciprocating tube 15 for passing through the valve 12 and into the vessel 11 when the valve 12 is open. The instrument also includes the means shown as the driving assembly 16 for inserting and retracting the tube 15 through the valve 12 and into the vessel 11 when the vessel 11 is in the cavity 22 and in the attenuator 23.

The nature, structure and function of attenuators is generally well understood in the microwave art. Basically, an attenuator in this context represents an opening in a microwave cavity that has a size and geometry that prevents microwaves from escaping therethrough. Because the purpose of the attenuator is to prevent the escape of microwave radiation, its diameter and length are related to the frequency of the microwave radiation being transmitted into the cavity 22 from the source 21. Well-established formulas are commonly used to determine the appropriate size of the attenuator, with a goal in the case of instruments for chemistry being an attenuator that is as large as possible to ease the movement of reaction vessels into and out of the cavity, while still preventing transmission of microwaves outside of the cavity 22.

Although FIG. 1 is a schematic diagram, it is taken to some extent in cross-sectional fashion, at least in terms of the vessel 11, the cavity 22 and the attenuator 23. Thus, in most cases the attenuator 23 will include or form a vertically-oriented cylinder (or its equivalent) extending upwardly from the cavity 22.

In preferred embodiments of the invention, the cavity 22 is a single mode cavity. Single mode cavities are preferred in instruments of this type for several reasons. Most often, they tend to provide a more controlled application of energy to the contents of the vessel 11. Multimode cavities can be appropriate or even favored for more robust types of reactions such as drying or digestion, but when applied to small organic samples, multimode microwave radiation can often drive such samples to an undesired decomposition.

The meaning and nature of single mode microwave radiation and microwave single mode cavities are well understood in this art, with the basic understanding that the characteristics of any given cavity are almost always dependent upon the frequency of microwave radiation being applied and thus are never independent of the source. Accordingly, it will be understood that the source and the cavity together are used to provide the desired single mode propagation at the applied or desired frequency.

The nature and operation of microwave sources is generally well understood, and the source 21 is preferably selected from the group consisting of magnetrons, klystrons, and solid-state devices depending upon a number of factors such as availability, reliability, frequency range and cost.

As illustrated in FIG. 1, in a preferred embodiments the mouth 13 of the reaction vessel 11 is outside of the cavity 22 and outside of the attenuator 23. In the most common arrangement, the vessel 11 is oriented vertically in the cavity 22 and the attenuator 23 so that when the valve 12 is outside of the attenuator 23 it is above the attenuator 23 and the cavity 22. By positioning the pressure resistant valve 12 outside of the cavity 22 and the attenuator 23, a valve can be selected independent of its interaction (or lack thereof) with microwave radiation. Although the valve 12 can be included or positioned within the cavity 22, the structure and composition of the materials in the valve must accordingly be selected to avoid undesired interaction with microwave energy. Because most appropriate pressure resistant valves include some portions that are made of metal, and because metal acts as a susceptor for microwave radiation in most circumstances, valves (or other fixtures) containing metal are typically segregated or shielded from the microwave cavity. Thus, positioning the valve 12 outside of the cavity 22 is preferred in most circumstances.

In preferred embodiments, the valve 12 can be oriented to vent gases (and thus pressure) from the vessel 11. In the schematic diagram of FIG. 1, this is indicated by the presence of the ports 25 and 27 and the pressure release vent 26. As illustrated in schematic fashion in FIG. 1, the valve 12 has three potential orientations: the open pathway illustrated at 14 that allows the tube 15 to be inserted and retracted from the vessel 11; an alternate orientation in which the vessel 11 is vented through the port 25 to the pressure release 26; and a third orientation from the vessel 11 to the port 27 to some desired destination.

In order to remove fluids and compositions from the vessel 11 and specifically through the tube 15 the instrument 10 includes a product pump 28, an additional valve 29, and additional fluid flow lines 30 and 38. When removing compositions from the vessel 11, the valve 29 is oriented to direct them through the line 30, to the product pump 28, and then through line 38 to another valve 31. The last valve 31 can be oriented to either direct waste or rinse compositions to the waste 34 through the waste line 35, or to direct products to the product reservoir 32 through the reservoir line 33.

In the same manner, the initial compositions (typically one or more reactants, potentially including catalysts) can reside in one or more supply reservoirs, two of which are illustrated at 36 and 37 in FIG. 1. Compositions can be pumped from the reservoirs 36, 37 using the pump 40 and the valve 41. Appropriate fluid lines 42, 43, 44 and 45 are included in schematic fashion to represent the movement of compositions from the reservoirs 36, 37 to the vessel 11.

FIG. 1 also schematically illustrates a processor 46 that is used in preferred embodiments to control several or all of the operations of the instrument 10. Given the wide range of processors and software available, in most circumstances the processor 46 can be the equivalent of a personal computer (e.g. Pentium® 4 processor at 2.26 GHz clock speed as of the filing date of this application) and can be selected, programmed and used in the instrument and method of the invention without undue experimentation.

As illustrated in FIG. 1, the processor 46 is in signal communication with the cavity 21 through the appropriate signal line 47 and is likewise in communication with the valve 12 through the signal line 50, with the driving assembly 16 through the signal line 51, and with the source valve 41 through the signal line 52. Although FIG. 1 illustrates the signal lines as being hard wired, it will be understood that they can also incorporate wireless connections such as the 802.11(b) ("WiFi") standard while functioning identically to a hard wired system. For the sake of clarity, other possible communication lines between the processor and the instrument are not illustrated, but it will be understood that the processor 46 can be in signal communication with any number of other items such as the pump 40, the pressure release vent 26, or the valve 31.

One additional connection is illustrated and is represented by the communication line 53 which is in signal communication with a temperature sensor 54 in or adjacent the cavity 22 for monitoring the temperature of the vessel 11 or of its contents. In preferred embodiments, and as illustrated in FIG. 1, the sensor 54 is positioned directly underneath the vessel 11 as this has been found to provide consistent and accurate measurements. In this manner, the monitored temperature can be used to moderate the application of microwaves from source 21 to the cavity 22 to thereby help control the temperature and progress of any reaction in the vessel 11. Although not illustrated, an appropriate pressure sensor can likewise be incorporated into the vessel 11 and can be placed in communication with the processor 46 for the purpose of measuring pressure and moderating the applied microwave radiation in response to the measured pressure.

In preferred embodiments, and as set forth for example in commonly assigned U.S. Pat. No. 6,227,041, the temperature sensor 54 is an infrared sensor, potentially using a fiber optic technique, that can measure the temperature of the vessel 11 and of its contents without interference from the microwave radiation (having different frequencies from infrared radiation) present in the cavity 22. The contents of U.S. Pat. No. 6,227,041 are incorporated entirely herein by reference.

Figure 2:
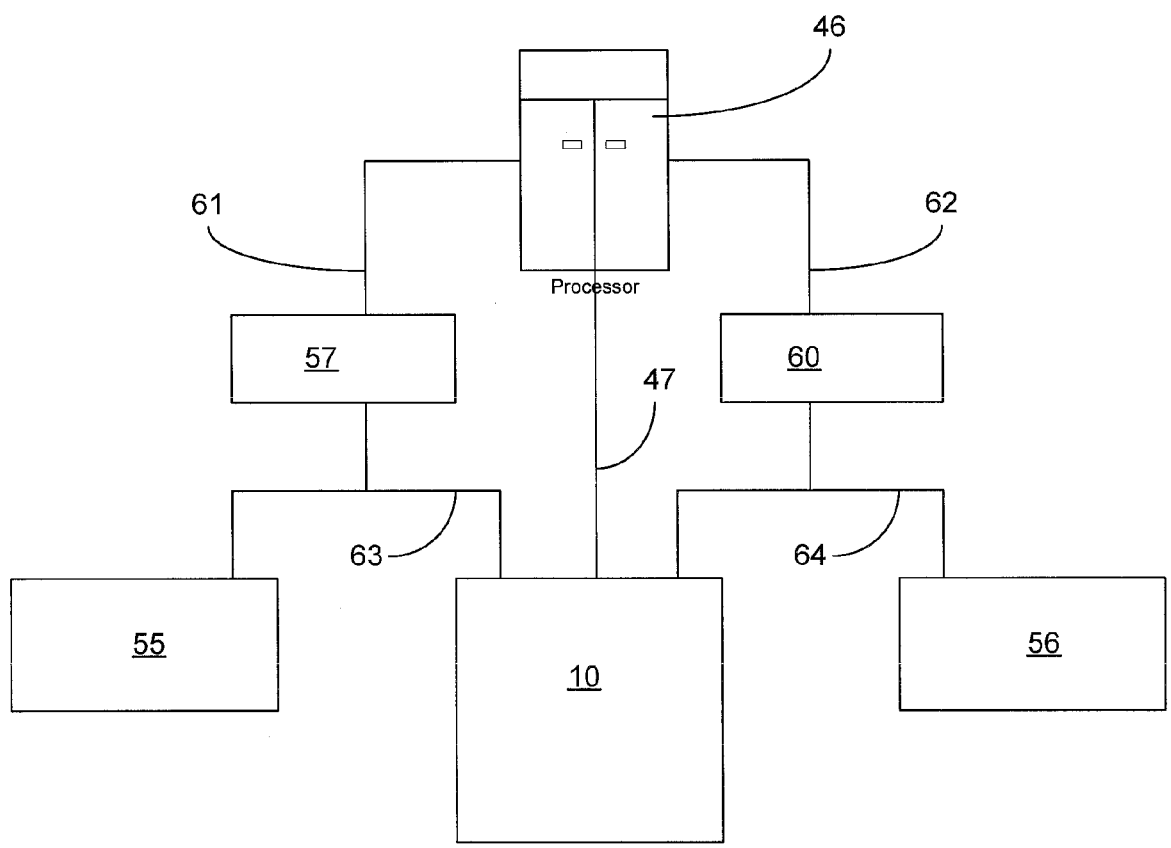
FIG. 2 is a second schematic diagram of the use of the present invention in connection with groups, arrays or libraries of compositions.

FIG. 2 is a schematic diagram illustrating the use of the instrument 10 including the processor 46 (which can include one or more processors as may be desired are necessary) in a manner that is particularly advantageous with respect to groups, arrays, or libraries of compounds and compositions. FIG. 2 illustrates a source array 55 and a product array 56. One or more robotic transfer devices schematically designated at 57 and 60 are likewise included. The processor 46 is in signal communication with the robotic transfer devices 57 and 60 through the respective signal lines 61 and 62 or equivalent wireless networks as explained above. Similarly, the processor 46 remains in signal communication with the instrument 10 (typically with the source 21) through the signal line 47 described with respect to FIG. 1.

In this aspect, the tube 15 is used to add compositions such as reactants, catalysts and solid support materials to the vessel 11, to remove products and byproducts from the vessel 11, and to rinse and clean the vessel 11 between cycles. These capabilities permit the rapid movement of reactants and products to and from the vessel 11 while eliminating the need to physically move source vessels, source libraries, source arrays or any other items to and from the instrument 10. In operation, the robotic transfer 57 merely needs to sample source materials from the source array 55 and transfer them to the instrument 10 through the transfer line indicated 63, and then repeat the same process using the robotic transfer 60 and the transfer lines 64. The number and arrangement of valves and pumps for this purpose are not fundamental to the invention, but rather are flexibly available to the skilled person and will of course depend upon the desired reaction being carried out and the materials necessary to be added and removed.

Accordingly, in another aspect the invention is a method of increasing the sequential rate at which a series of microwave assisted chemical reactions that potentially generate or require high pressure can be carried out. In this embodiment, the method comprises opening the pressure resistant valve on a microwave transparent pressure resistant vessel to define an unpressurized pathway through the valve into the vessel, inserting it through the pathway in the valve and into the vessel, transferring at least one composition into the vessel through the tube, removing the tube from the vessel and from the pathway in the valve, closing the valve to seal the vessel against pressure release, and then exposing the vessel and its contents to microwave radiation.

In this embodiment, the method preferably further comprises reopening the valve after the exposure to microwave radiation to vent any high pressure from the vessel, thereafter inserting the tube through the valve into the vessel, and thereafter removing contents from the vessel through the tube. Depending upon the reaction, some or all of the contents can be removed as may be desired or necessary. Additionally, depending upon the type of valve selected, the step of venting the vessel can be carried out without opening the pathway for the tube; i.e., the valve (as illustrated at 12 in FIG. 1) can have different orientations for the pathway, for venting, and for delivering products following a reaction sequence.

In this embodiment, the method also can further comprise adding a new composition (i.e., a second portion of the same composition or a different composition) through the tube and into the vessel following the step of removing the original contents from the vessel, and thereafter repeating the steps of removing the tube, closing the valve and exposing the vessel and its contents to microwave radiation. This sequence of steps can, of course, be repeated as many times as necessary to create, modify, or analyze groups, arrays or libraries of compositions. Most preferably, the method comprises adding a rinsing composition to the vessel through the tube and removing the rinsing composition from the vessel through the tube, with both of the rinsing steps being carried out between the steps of removing the previous contents from the vessel and adding the new composition to the vessel.

As noted with respect to the instrument embodiments of the invention, the method can comprise monitoring the temperature of the vessel and its contents and moderating the application of microwave energy based upon the monitor temperature. Similarly, the method can comprise monitoring the pressure inside the vessel and moderating the application of microwave energy based upon the monitored pressure. Such moderation can comprise moderating the power applied or generated by the source as set forth in commonly assigned U.S. Pat. Nos. 6,288,379 and 6,084,226 or by moderating the microwaves as they travel between the source and the cavity as set forth in commonly assigned U.S. Pat. No. 5,796,080. The contents of these patents are incorporated entirely herein by reference.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. An instrument for increasing the rate at which high-pressure sequential microwave-assisted chemical reactions can be carried out, said instrument comprising:
   a source of microwave radiation;
   a cavity in microwave communication with said source;
   an attenuator that forms at least a portion of said cavity;
   a pressure-resistant microwave-transparent reaction vessel having portions in said cavity and portions in said attenuator;
   a pressure-resistant valve on the mouth of said vessel;
   a reciprocating tube for passing through said valve and into said vessel when said valve is open;
   means for mechanically inserting and retracting the tube through said valve and into said vessel when said vessel is in said cavity and said attenuator.

2. An instrument according to claim 1 comprising a single mode cavity.

3. An instrument according to claim 1 wherein said microwave source is selected from the group consisting of magnetrons, klystrons, and solid state devices.

4. An instrument according to claim 1 wherein said mouth of said reaction vessel is outside of said cavity and outside of said attenuator.

5. An instrument according to claim 1 comprising a waveguide between said source and said cavity.

6. An instrument according to claim 1 further comprising means for venting said vessel without opening said valve to said tube.

7. An instrument according to claim 6 wherein said valve includes said venting means.

8. An instrument according to claim 1 further comprising:
   a source array; and
   a robotic sampler in fluid communication with said source array and with said tube for transferring fluid from said source array to said reaction vessel independent of any movement of said reaction vessel or of said source array or of any source vessels in said source array.

9. An instrument according to claim 8 further comprising:
   a product array; and
   a robotic sampler in fluid communication with said product array and with said tube for transferring fluid from said reaction vessel to said product array independent of any movement of said reaction vessel or of said product array or of any product vessels in said product array.

* * * * *